(12) United States Patent
Haustein et al.

(10) Patent No.: US 7,631,034 B1
(45) Date of Patent: Dec. 8, 2009

(54) OPTIMIZING NODE SELECTION WHEN HANDLING CLIENT REQUESTS FOR A DISTRIBUTED FILE SYSTEM (DFS) BASED ON A DYNAMICALLY DETERMINED PERFORMANCE INDEX

(75) Inventors: Nils Haustein, Soergenloch (DE); Sven Oehme, Ober-Hilbersheim (DE); Ulf Troppens, Mainz (DE); Rainer Wolafka, Bad Soden (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/233,002

(22) Filed: Sep. 18, 2008

(51) Int. Cl.
   *G06F 15/16* (2006.01)
   *G06F 9/46* (2006.01)
(52) U.S. Cl. ...................... 709/201; 718/105
(58) Field of Classification Search ............... 709/201
   See application file for complete search history.

(56) References Cited

U.S. PATENT DOCUMENTS

| | | | |
|---|---|---|---|
| 6,757,836 B1 | 6/2004 | Kumar et al. | |
| 7,054,934 B2 | 5/2006 | Graupner et al. | |
| 7,249,358 B2 * | 7/2007 | Emma et al. | 718/105 |
| 2001/0034752 A1 | 10/2001 | Kremien | |
| 2002/0007417 A1 * | 1/2002 | Taylor et al. | 709/231 |
| 2002/0059429 A1 * | 5/2002 | Carpenter et al. | 709/227 |
| 2003/0140108 A1 | 7/2003 | Sampathkumar | |
| 2003/0158940 A1 * | 8/2003 | Leigh | 709/226 |
| 2004/0236860 A1 * | 11/2004 | Logston et al. | 709/230 |
| 2004/0254984 A1 | 12/2004 | Dinker | |
| 2005/0175245 A1 | 8/2005 | Sutanto et al. | |
| 2006/0029076 A1 | 2/2006 | Namihira et al. | |
| 2006/0282435 A1 | 12/2006 | Moon et al. | |

OTHER PUBLICATIONS

Madhyastha, T.M., et al., "Optimizing Input/Output Using Adaptive File System Policies", Proc. of 5th NASA Goddard Conf. on Mass Storage Systems, 1996.
Ozsu, M.T., et al., "Distributed and Parallel Database Systems", ACM Computing Surveys (CSUR), vol. 28, No. 1, pp. 125-128, Mar. 1996.

* cited by examiner

*Primary Examiner*—Jeffrey Pwu
*Assistant Examiner*—Noel Beharry
(74) *Attorney, Agent, or Firm*—Patents On Demand, PA; Brian K. Buchheit

(57) ABSTRACT

The present invention can include an automated method that optimizes the selection of a node in a distributed file system (DFS) to fulfill a client request. Such a method can begin when a client request is received by a master node of a distributed file system (DFS). The DFS can include a multitude of DFS nodes capable of accessing various resources. Two or more DFS nodes can be preselected to fulfill the client request. Each preselected DFS node can then participate in a voting process to dynamically determine the response DFS node that can optimally respond to the client request. The client request can be fulfilled by response DFS node, utilizing the DFS node best capable of servicing the client request.

6 Claims, 3 Drawing Sheets

300

Example Performance Data 305

| Node ID | Resources | Perf_Idx | Net_Util | Avg_Resp_Time |
|---|---|---|---|---|
| Node1 | /share2 | 89 | 30 | 45 ms |
| Node2 | /share1 | 20 | 87 | 95 ms |
| Node2 | /share2 | 60 | 59 | 77 ms |

Example Weighting Data 350

| Condition | Weight |
|---|---|
| Net_Util = 100 | 0 |
| Net_Util = 51-99 | 20 |
| Net_Util = 1-50 | 50 |
| Net_Util = 0 | 100 |

OPTIMIZING NODE SELECTION WHEN HANDLING CLIENT REQUESTS FOR A DISTRIBUTED FILE SYSTEM (DFS) BASED ON A DYNAMICALLY DETERMINED PERFORMANCE INDEX

BACKGROUND OF THE INVENTION

The present invention relates to the field of distributed file systems, and, more particularly, to optimizing the selection of nodes when handling client requests in a distributed file system (DFS) based on a determined performance index.

A file system is a method that allows computer systems to store and organize computer files such that users are provided with an easy way to find and access the files. A specialized file system used in a computer network environment is called a distributed file system (DFS), such as the DFS 120 illustrated in system 100 of FIG. 1. A DFS 120 is a single file system that has been distributed across several physical computers, called DFS nodes 140, 150, 160, and 170. The data 145, 155, 165, and 175 that are scattered across the multiple DFS nodes 140, 150, 160, and 170 appear to the clients 102, 104, and 106 as if they all exist on the same server. The quantity of nodes and the actual distribution of the files are completely transparent to the client applications requesting data.

When handling client data requests, the master node 130 determines which DFS node 140, 150, 160, or 170 is capable of providing the requested data. The master node 130 uses the information stored in the internal mapping table 135 and a selection algorithm, such as a "round robin" or "least frequently used" method, to select a DFS node 140, 150, 160, and 170. Such selection algorithms, however, are static in nature and do not take into account the current state and/or utilization of the DFS nodes 140, 150, 160, and 170 and/or computer network 110 at the time of selection.

The overall performance of the DFS 120 can be greatly diminished by this inefficient selection process. For example, a selected DFS node 140, 150, 160, and 170 may reside in a segment of the network 110 that is experiencing heavy traffic. When the selected DFS node 140, 150, 160, or 170 is under a heavy load, the fulfillment of the client request is delayed. Long delays can result in the request timing out and not being fulfilled at all.

Additionally, this present situation results in the over-utilization of some DFS nodes 140, 150, 160, and/or 170 and the under-utilization of other DFS nodes 140, 150, 160, and/or 170. For example, a "round robin" method can result in DFS nodes 140 and 160 being selected to fulfill requests for "/share3" in addition to requests for "/share1", which DFS nodes 140 and 160 are the only access points. This approach under-utilizes DFS node 170 to handle requests for "/share3", of which it is a dedicated access point.

BRIEF DESCRIPTION OF THE SEVERAL VIEWS OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

Figure 1:
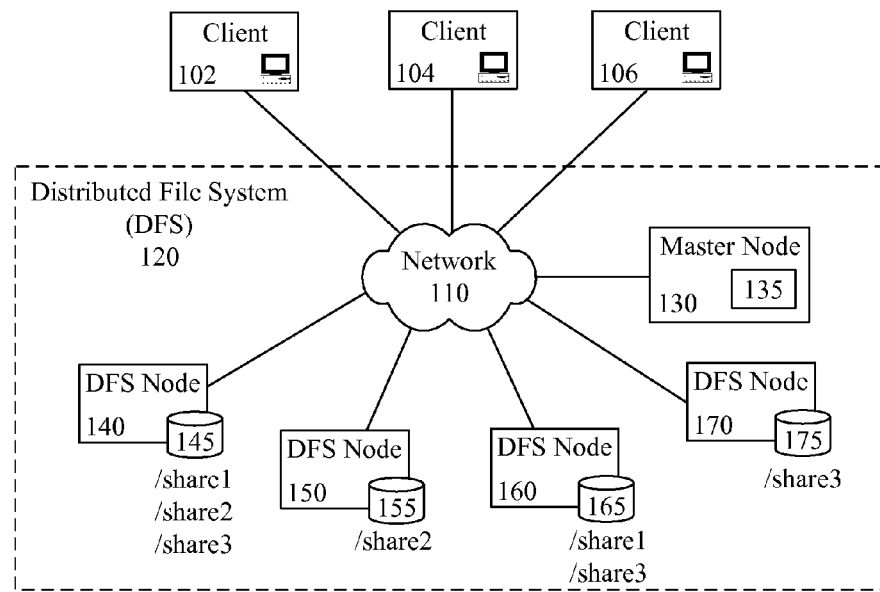
FIG. 1 (Prior Art) is a schematic diagram illustrating a distributed file system (DFS).

The present invention discloses a solution that can optimize the selection of a node to handle a client request in a distributed file system (DFS). The master node of the DFS can be modified to contain an optimized response node selector that can utilize performance data of the DFS nodes to determine which nodes can potentially handle a client request. The DFS nodes can be configured to include a selection agent for determining which of the nodes can best handle the client request under current operating conditions. The selection agent can calculate a performance index that quantifies the node's ability to efficiently handle the client request based on predetermined performance measures, such as network traffic and processor utilization. The DFS node having the best performance index can then be used to fulfill the client request.

The present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including, but not limited to the Internet, wireline, optical fiber cable, RF, etc.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. Examples of a computer-readable medium include a semiconductor or solid state memory, magnetic tape, a removable computer diskette, a random access memory (RAM), a read-only memory (ROM), an erasable programmable read-only memory (EPROM or Flash memory, a rigid magnetic disk and an optical disk. Current examples of optical disks include compact disk-read only memory (CD-ROM), compact disk-read/write (CD-R/W) and DVD. Other computer-readable medium can include a transmission media, such as those supporting the Internet, an intranet, a personal area network (PAN), or a magnetic storage device. Transmission media can include an electrical connection having one or more wires, an optical fiber, an optical storage device, and a defined segment of the electromagnet spectrum through which digitally encoded content is wirelessly conveyed using a carrier wave.

Note that the computer-usable or computer-readable medium can even include paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

The present invention is described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Figure 2:
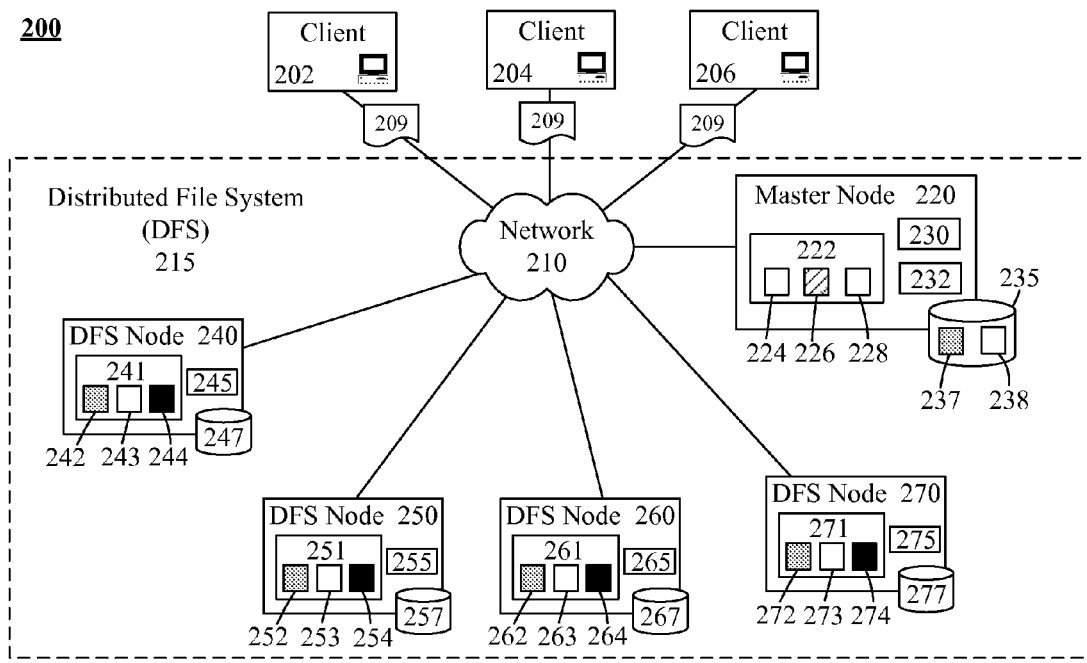
FIG. 2 is a schematic diagram illustrating a system that optimizes the selection of a node by a master node in a distributed file system (DFS) to fulfill a client request in accordance with embodiments of the inventive arrangements disclosed herein.

FIG. 2 is a schematic diagram illustrating a system 200 that optimizes the selection of a node 240, 250, 260, and 270 by a master node 220 in a distributed file system (DFS) 215 to fulfill a client request 209 in accordance with embodiments of the inventive arrangements disclosed herein. In system 200, a client 202, 204, or 206 can be serviced by a DFS node 240, 250, 260, and 270 dynamically determined as capable of optimally handling their request 209.

A DFS 215 can represent a file system whose data files and/or resources, herein referred to as data, can be distributed over a network 210 among multiple computing devices called DFS nodes 240, 250, 260, and 270. This distribution of data can be transparent to clients 202, 204, and 206 when accessing a file or viewing the DFS 215 structure. The distributed nature of the DFS 215 can distribute the load of client requests 209 among multiple DFS nodes 240, 250, 260, and/or 270 that have access to the requested file or resource.

A client 202, 204, and 206 can represent a computing device capable of interacting with the DFS 215 over a network 210 to access data 247, 257, 267, and/or 277. To access the data 247, 257, 267, and/or 277, a client 202, 204, or 206 can issue a client request 209 to the DFS 215. Client requests 209 can be handled by a specialized node of the DFS 215 called the master node 220. The master node 220 can include an optimal response node provider 222, an internal mapping table 230, and one or more network analysis tools 232.

Unlike in the conventional DFS implementation 120 shown in FIG. 1, the master node 220 can be configured to fulfill a client request 209 with a responding DFS node 240, 250, 260, or 270 dynamically determined as the optimal choice for service. The determination of the optimal response DFS node 240, 250, 260, or 270 can comprise a two-step process. The first step can be performed by optimal response node provider of the master node 220.

The optimal response node provider 222 can represent a software application configured to provide the master node 220 with the identifier or handle of the optimal response DFS node 240, 250, 260, or 270. The optimal response node provider 222 can include a node performance data manager 224, a node pre-selector 226, a node voting handler 228, and a data store 235 containing performance data 237 and weighting data 238.

The node performance data manager 224 can be a component of the optimal response node provider 222 configured to manage the stored performance data 237 for all the DFS nodes 240, 250, 260, and 270 of the DFS 215. The node performance data manager 224 can utilize the mapping table 230 to relate DFS nodes 240, 250, 260, and 270 and their accessible data 247, 257, 267, and 277. In another embodiment, the mapping table 230 can be stored in the data store 235.

The performance data 237 can represent a variety of performance characteristics of the DFS nodes 240, 250, 260, and 270, including, but not limited to, processor utilization, memory utilization, available storage space, network latency, network location, the amount of time to handle input and output requests, the quantity of active processes, available network bandwidth, and the like.

The performance data 237 can be collected by the node performance data manager 224 from the DFS nodes 240, 250, 260, and 270 on a periodic basis, such as every five minutes. Collection of the performance data 237 can occur in a variety of manners, such as a push method, where the DFS nodes 240, 250, 260, and 270 "push" data to the node performance data manager 224, or a pull method, where the node performance data manager 224 requests or "pulls" the performance data 237 from the DFS nodes 240, 250, 260, and 270. Performance data 237 relating to network 210 performance can be collected from the network analysis tools 232 of the master node.

The performance data 237 can then be utilized by the node pre-selector 226 to preselect two or more DFS nodes 240, 250, 260, and/or 270 that are capable of handling the client request 209. The node pre-selector 226 can also utilize the weighting data 238 to affect the preselection.

The weighting data 238 can represent a means to influence the preselection of DFS nodes 240, 250, 260, and 270 based on the values of specific performance data 237. For example, DFS nodes 240, 250, 260, or 270 running more than 45 active processes can be weighted such that they can be removed from the preselection process. That is, such DFS nodes 240, 250, 260, or 270 can be considered as being over-utilized and, therefore, should not be considered to handle the current client request 209.

Once the node pre-selector 226 has completed the preselection process, the preselected nodes can be contacted by the node voting handler 228. The node voting handler 228 can be a component of the optimal response node provider 222 configured to oversee the second step of the process for determining the optimal response DFS node, which can be performed by the selection agent 241, 251, 261, and 271 of the preselected DFS nodes 240, 250, 260, and/or 270.

It should be emphasized that the node voting handler 228 only contacts those DFS nodes 240, 250, 260, and/or 270 preselected by the node pre-selector 226 to participate in the voting process. All other DFS nodes 240, 250, 260, and/or 270 are unaffected.

Each DFS node 240, 250, 260, and 270 of the DFS 215 can include one or more performance analysis tools 245, 255, 265, and 275, and a selection agent 241, 251, 261, and 271. The selection agent 241, 251, 261, and 271 can represent a software application configured to perform functions supporting the determination of the optimal response DFS node for a client request 209. The selection agent 241, 251, 261, and 271 can include a performance data handler 242, 252, 262, 272, a performance index calculator 243, 253, 263, and 273, and a voting processor 244, 254, 264, and 274.

The performance data handler 242, 252, 262, 272 can represent a component of the selection agent 241, 251, 261, and 271 configured to collect the performance data 237 from the performance analysis tools 245, 255, 265, and 275 of the DFS node 240, 250, 260, and 270. The performance analysis tools 245, 255, 265, and 275 can represent a variety of software tools capable of monitoring specified performance characteristics of the DFS node 240, 250, 260, and 270. For example, a DFS node 240, 250, 260, or 270 can utilize the TIMEX tool to monitor processor utilization and the IOSTAT tool for input/output handling data.

The collected performance data 237 can be provided to the node performance data manager 224 of the master node 220 and/or the performance index calculator 243, 253, 263, and 273. The performance index calculator 243, 253, 263, and 273 can represent a component of the selection agent 241, 251, 261, and 271 configured to dynamically calculate the performance index for the DFS node 240, 250, 260, and 270.

The performance index can utilize an algorithm to produce a quantitative rating of the DFS node's 240, 250, 260, and 270 current capability to service the client request 209. For example, a rating value can be assigned to each performance characteristic of the DFS node 240, 250, 260, and 270, then all the rating values can be summed to produce the performance index.

It should be noted that the performance index can be a data element provided to the optimal response node provider 222 as performance data 237. However, the value of the performance index contained within the performance data 237 is a snapshot of the DFS node 240, 250, 260, and 270, which could have changed by the time the next client request 209 is received. Thus, calculating the performance index immediately prior to fulfilling the client request 209 can provide the most accurate context of the DFS node's 240, 250, 260, and 270 ability to optimally service the client request 209.

Once the performance index is calculated, the voting processor 244, 254, 264, and 274 can exchange the calculated performance index with all other preselected DFS nodes 240, 250, 260, and/or 270. When each preselected DFS node 240, 250, 260, and/or 270 has all the performance index values of all the other preselected DFS nodes 240, 250, 260, and/or 270, the voting processor 244, 254, 264, and 274 can then determine if their respective DFS node 240, 250, 260, or 270 is the optimal response DFS node.

The voting processor 244, 254, 264, and 274 of the DFS node 240, 250, 260, or 270 determined to be the optimal response DFS node can then communicate this information back to the node voting handler 228 of the master node 220. The master node 220 can then provide the requesting client 202, 204, or 206 with the handle of the DFS node 240, 250, 260, or 270 determined to be the optimal response DFS node.

Communications between the DFS nodes 240, 250, 260, and 270 and the master node 220 can be achieved by extending the functionality of the standard message exchange sequence of connection/discovery/communication. Alternately, the set of Remote Procedure Calls (RPCs) can be expanded to include new commands to implement the new communication functionality.

As used herein, network 201 can include any hardware/software/and firmware necessary to convey digital content encoded within carrier waves. Content can be contained within analog or digital signals and conveyed through data or voice channels and can be conveyed over a personal area network (PAN) or a wide area network (WAN). The network 201 can include local components and data pathways necessary for communications to be exchanged among computing device components and between integrated device components and peripheral devices. The network 201 can also include network equipment, such as routers, data lines, hubs, and intermediary servers which together form a packet-based network, such as the Internet or an intranet. The network 201 can further include circuit-based communication components and mobile communication components, such as telephony switches, modems, cellular communication towers, and the like. The network 201 can include line based and/or wireless communication pathways.

Each of the data stores 247, 235, 257, 267, 277 can be physically implemented within any type of hardware including, but not limited to, a magnetic disk, an optical disk, a semiconductor memory, a digitally encoded plastic memory, a holographic memory, or any other recording medium. The data stores 247, 235, 257, 267, 277 can be a stand-alone storage unit as well as a storage unit formed from a plurality of physical devices, which may be remotely located from one another. Additionally, information can be stored within each data store 247, 235, 257, 267, 277 in a variety of manners. For example, information can be stored within a database structure or can be stored within one or more files of a file storage system, where each file may or may not be indexed for information searching purposes.

It should be noted that the two-step process of system 200 provides efficiency to the DFS 215 lacking in conventional implementations, such as the DFS 120 of FIG. 1. A conventional DFS 120 lacks the components to monitor and/or utilize the operating conditions of the DFS nodes 140, 150, 160, and 170. Thus, the master node 130 utilizes a static algorithm to select nodes to service client requests.

Figures 3, 4:
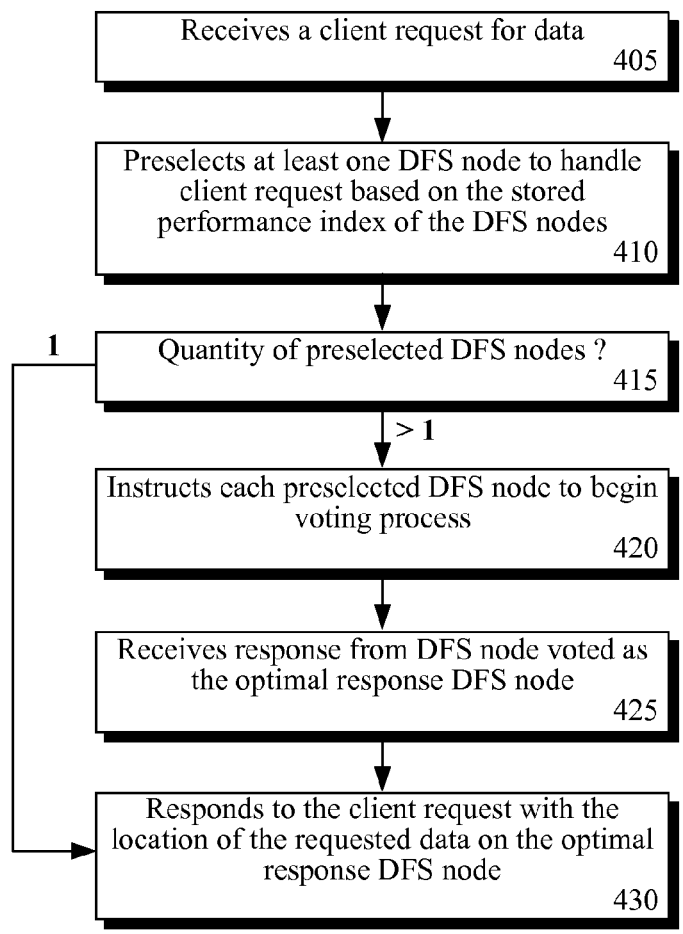
FIG. 3 is a collection of example data tables that can be used to optimize the selection of a DFS node to fulfill a client request in accordance with embodiments of the inventive arrangements disclosed herein.
FIG. 4 is a flow chart of a method describing the operation of the optimal response node provider of the master node in accordance with an embodiment of the inventive arrangements disclosed herein.

FIG. 3 is a collection 300 of example data tables 305 and 350 that can be used to optimize the selection of a DFS node to fulfill a client request in accordance with embodiments of the inventive arrangements disclosed herein. The tables 305 and 350 of collection 300 can be utilized by the optimal response node provider 222 of master node 220 or any other system configured to dynamically select DFS nodes based on their current operating conditions.

Table 305 can contain multiple data elements for storing example performance data. These data elements can include identifiers for the DFS nodes 310, the resource or resources 315 that the DFS node can access, and various performance characteristic elements 320.

As shown in this example 305, the DFS node identified as Node1 can access "/share2", has a performance index of 89, a network utilization of 30, and an average response time of 45 ms. The DFS node identified as Node2 can access "/share1" and "/share2". When accessing "/share1", Node2 has a performance index of 20, a network utilization of 87, and an average response time of 95 ms. When accessing "/share2", Node2 has a performance index of 60, a network utilization of 59, and an average response time of 77 ms.

Table 350 can contain data elements that describe how the performance characteristic elements 320 of table 305 can be adjusted when the optimal response node provider is preselecting DFS nodes. In this table 350, conditions 355 of the various performance characteristics 320 can be defined with associated weight values 360.

As shown in this example 350, a DFS node with a value for network utilization equal to 100 is weighted as 0, between 51 and 99 is weighted as 20, between 1 and 50 is weighted as 50, and equal to 0 is weighted as 100. Thus, when the optimal response node provider analyzes the performance data table 305 for "/share2", the performance index values for Node1 and Node2 can both be determined to weighted by in accordance with the example weighting data table 350.

Weighting data 350 can exist for multiple performance characteristics 320, in one or separate tables. Therefore, the optimal response node provider can apply all applicable weighting values 360 to the performance indexes of the DFS nodes during the preselection process.

Additionally, the conditions 355 can be expressed utilizing BOOLEAN logic between multiple performance characteristics 320. For example, a weighting value 360 can be defined for DFS nodes having both a network utilization between 30 and 60 AND an average response time less than 35 ms.

FIG. 4 is a flow chart of a method 400 describing the operation of the optimal response node provider 222 of the master node 220 in accordance with an embodiment of the inventive arrangements disclosed herein. Method 400 can be performed in the context of system 200 and/or utilizing the example tables 305 and 350 of collection 300.

Method 400 can begin in step 405 where the optimal response node provider 222 can receive a client request 209 for data. In step 410, DFS nodes 240, 250, 260, and/or 270 can be preselected to handle the client request 209 based upon the calculated performance index of the DFS nodes 240, 250, 260, and 270.

The quantity of preselected DFS nodes 240, 250, 260, and/or 270 can be determined in step 415. When more than one DFS node 240, 250, 260, and/or 270 has been preselected, step 420 can execute where the preselected DFS nodes 240, 250, 260, and/or 270 can be instructed to begin the voting process. In step 425, the optimal response node provider 222 can receive a response from the DFS node 240, 250, 260, or 270 voted as the optimal response DFS node to handle the client request 209.

Upon receipt of the response from the optimal response node or when exactly one has been preselected in step 410, step 430 can execute where the client request 209 can be responded to by the optimal response node provider 222. The response of step 425 can include the location of the requested data on the optimal response DFS node 240, 250, 260, or 270 or the singularly preselected DFS node 240, 250, 260, or 270, depending upon the flow executed to reach step 430.

Figure 5:
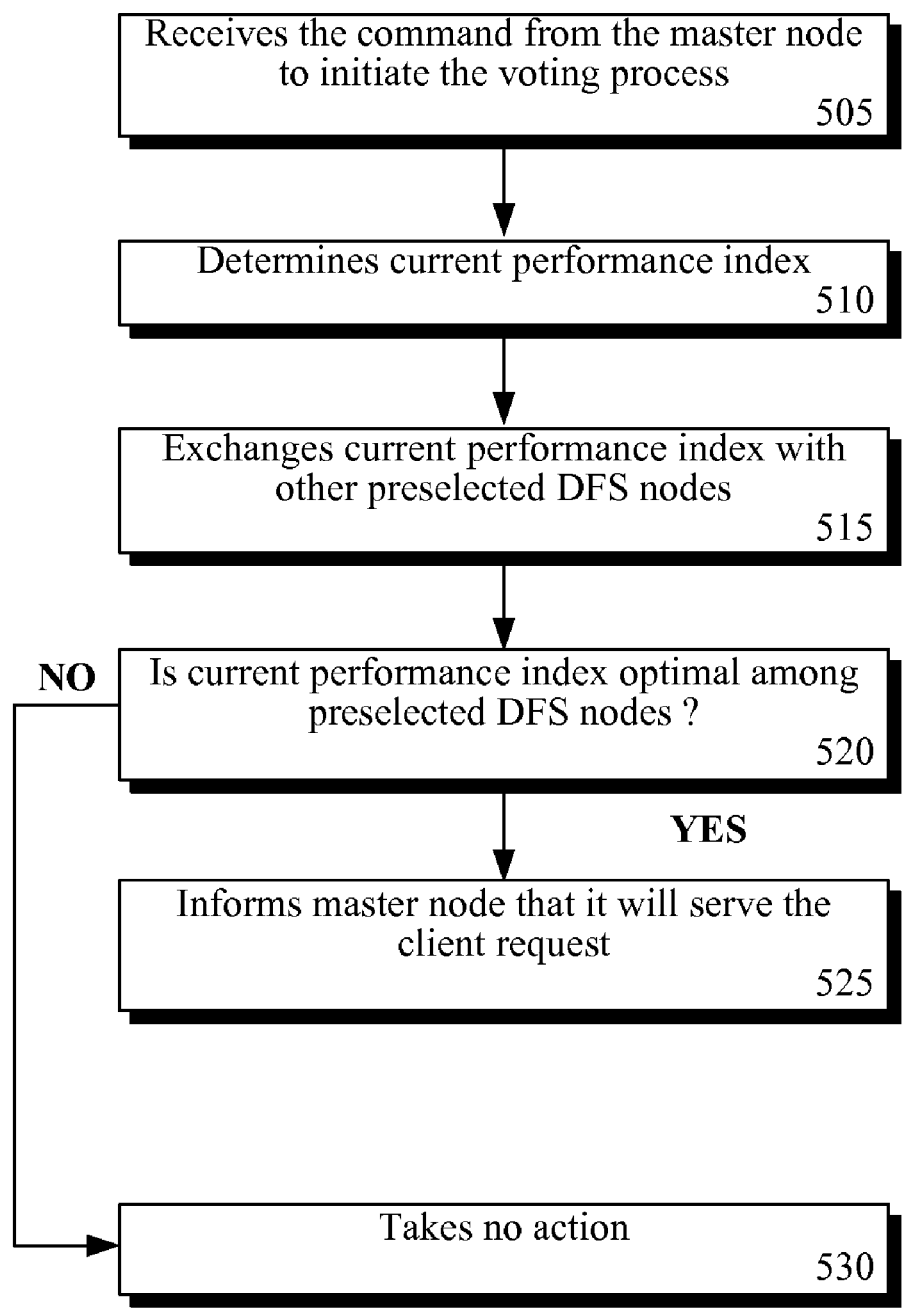
FIG. 5 is a flow chart of a method describing the voting process performed by the selection agent of the DFS nodes in accordance with an embodiment of the inventive arrangements disclosed herein.

FIG. 5 is a flow chart of a method 500 describing the voting process performed by the selection agent 241, 251, 261, and 271 of the DFS nodes 240, 250, 260, and 270 in accordance with an embodiment of the inventive arrangements disclosed herein. Method 500 can be performed in the context of system 200.

Method 500 can begin in step 505 where the selection agent 241, 251, 261, and 271 can receive a command from the master node 220 to initiate the voting process. In step 510, the current performance index of the DFS node can be determined. The current performance index can be exchanged with the other preselected DFS nodes 240, 250, 260, and/or 270 in step 515.

In step 520, it can be determined if the current performance index is the optimal performance index among the preselected DFS nodes 240, 250, 260, and/or 270. When the DFS node 240, 250, 260, and/or 270 does not have the optimal performance index, step 530 can execute where the selection agent takes no further action.

When the DFS node 240, 250, 260, or 270 is determined to have the optimal performance index, step 525 can execute where the selection agent 241, 251, 261, or 271 can inform the master node 220 that it will service the client request 209.

The diagrams in FIGS. 2-5 illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. An automated method that optimizes the selection of a node in a distributed file system (DFS) to fulfill a client request comprising:
   iteratively collecting and maintaining network performance data for a plurality of DFS nodes at a master node, wherein each of said DFS nodes and said master node comprise a computer program product stored in a memory coupled to a processor able to execute the computer program product;
   receiving a client request for a resource by a master node of a distributed file system (DFS), wherein the DFS comprises a plurality of DFS nodes having access to a plurality of resources, wherein the requested resource is accessible by at least two of the DFS nodes;
   preselecting at least two DFS nodes from the plurality of DFS nodes, wherein the at least two DFS nodes are capable of fulfilling the client request, wherein the preselection utilizes network performance data maintained by the master node associated with each of the plurality of DFS nodes to preselect only those nodes that are not over utilized as defined by node specific performance data;
   in response to the preselecting step, each preselected DFS node and no other DFS node of the plurality of DFS nodes participating in a voting process, wherein said voting process dynamically determines an optimal response DFS node for the client request, during said voting process:
      each DFS node calculating a performance index value which is a quantitative rating of the DFS nodes' current capability to service the client request;
      each of said preselected DFS nodes conveying the calculated performance index value to other ones of the preselected DFS nodes;
      once a DFS node has received performance index values from the other preselected DFS nodes that DFS node determining whether its performance index value is at least as good as the received performance index values from other DFS nodes; and
      when a positive determination results, the DFS node having positive determination results determining that it is to be designated as an optimal response node for the client request which results in a conveyance of a message indicating that the node is an optimal response node to the master node;
   fulfilling the client request with the optimal response DFS node, whereby providing the requestor with a DFS node best capable of servicing the client request.

2. The method of claim 1, wherein participating in the voting process further comprises:
   each preselected DFS node receiving a voting invitation from the master node;
   responsive to the receiving step, dynamically calculating values for a plurality of performance characteristics of the DFS node; and
   algorithmically combining the calculated values to generate the performance index value for the DFS node, and wherein upon receiving a message indicating that the DFS node is an optimal response node, the master node provides a requestor with a identifier for the optimal response node.

3. A computer program product that optimizes the selection of a node in a distributed file system (DFS) to fulfill a client request comprising:
   a computer usable medium digitally encoded in a physical storage medium having computer usable program code embodied therewith, the computer usable program code comprising:
   computer usable program code configured to iteratively collect and maintain network performance data for a plurality of DFS nodes at a master node, wherein each of said DFS nodes and said master node comprise a computer program product stored in a memory coupled to a processor able to execute the computer program product;
   computer usable program code configured to receive a client request for a resource by a master node of a distributed file system (DFS), wherein the DFS comprises a plurality of DFS nodes having access to a plurality of resources, wherein the requested resource is accessible by at least two of the DFS nodes;
   computer usable program code configured to preselect at least two DFS nodes from the plurality of DFS nodes, wherein the at least two DFS nodes are capable of fulfilling the client request, wherein the preselection utilizes network performance data maintained by the master node associated with each of the plurality of DFS nodes to preselect only those nodes that are not over utilized as defined by node specific performance data;
   computer usable program code configured to have each preselected DFS node and no other DFS node of the plurality of DFS nodes participate in a voting process, wherein said voting process dynamically determines an optimal response DFS node for the client request during said voting process:
      each DFS node calculating a performance index value which is a quantitative rating of the DFS nodes' current capability to service the client request;
      each of said preselected DFS nodes conveying the calculated performance index value to other ones of the preselected DFS nodes;
      once a DFS node has received performance index values from the other preselected DFS nodes that DFS node determining whether its performance index value is at least as good as the received performance index values from other DFS nodes; and
      when a positive determination results the DFS node having positive determination results determining that it is to be designated as an optimal response node for the client request which results in a conveyance of a message indicating that the node is an optimal response node to the master node;

fulfilling the client request with the optimal response DFS node, whereby providing the requester with a DFS node best capable of servicing the client request.

4. The computer program product of claim 3, further comprises:

computer usable program code configured for each preselected DFS node to receive a voting invitation from the master node;

computer usable program code configured to, responsive to the receiving step, dynamically calculate values for a plurality of performance characteristics of the DFS node; and computer usable program code configured to algorithmically combine the calculated values to generate the performance index value for the DFS node, and wherein upon receiving a message indicating that the DFS node is an optimal response node, the master node providing a requestor with a identifier for the optimal response node.

5. The method of claim 1, wherein said resource is an electronic file, wherein said distributed file system (DFS) is one that has been distributed across several physical servers, where files maintained by the several physical servers appear to requesting clients as if these files exist on the same server, where a quantity of DFS nodes in the distributed file system (DFS) and the distribution of files among the DFS nodes is transparent to requesting clients, wherein each DFS nodes has access to a plurality of locally stored electronic files, where the requested resource is an electronic file locally accessible by at least two of the DFS nodes.

6. The computer program product of claim 3, wherein said resource is an electronic file, wherein said distributed file system (DFS) is one that has been distributed across several physical servers, where files maintained by the several physical servers appear to requesting clients as if these files exist on the same server, where a quantity of DFS nodes in the distributed file system (DFS) and the distribution of files among the DFS nodes is transparent to requesting clients, wherein each DFS nodes has access to a plurality of locally stored electronic files, where the requested resource is an electronic file locally accessible by at least two of the DFS nodes.

* * * * *